April 8, 1930.    E. H. McCLOUD    1,753,993
BUMPER
Filed July 26, 1928    2 Sheets-Sheet 1
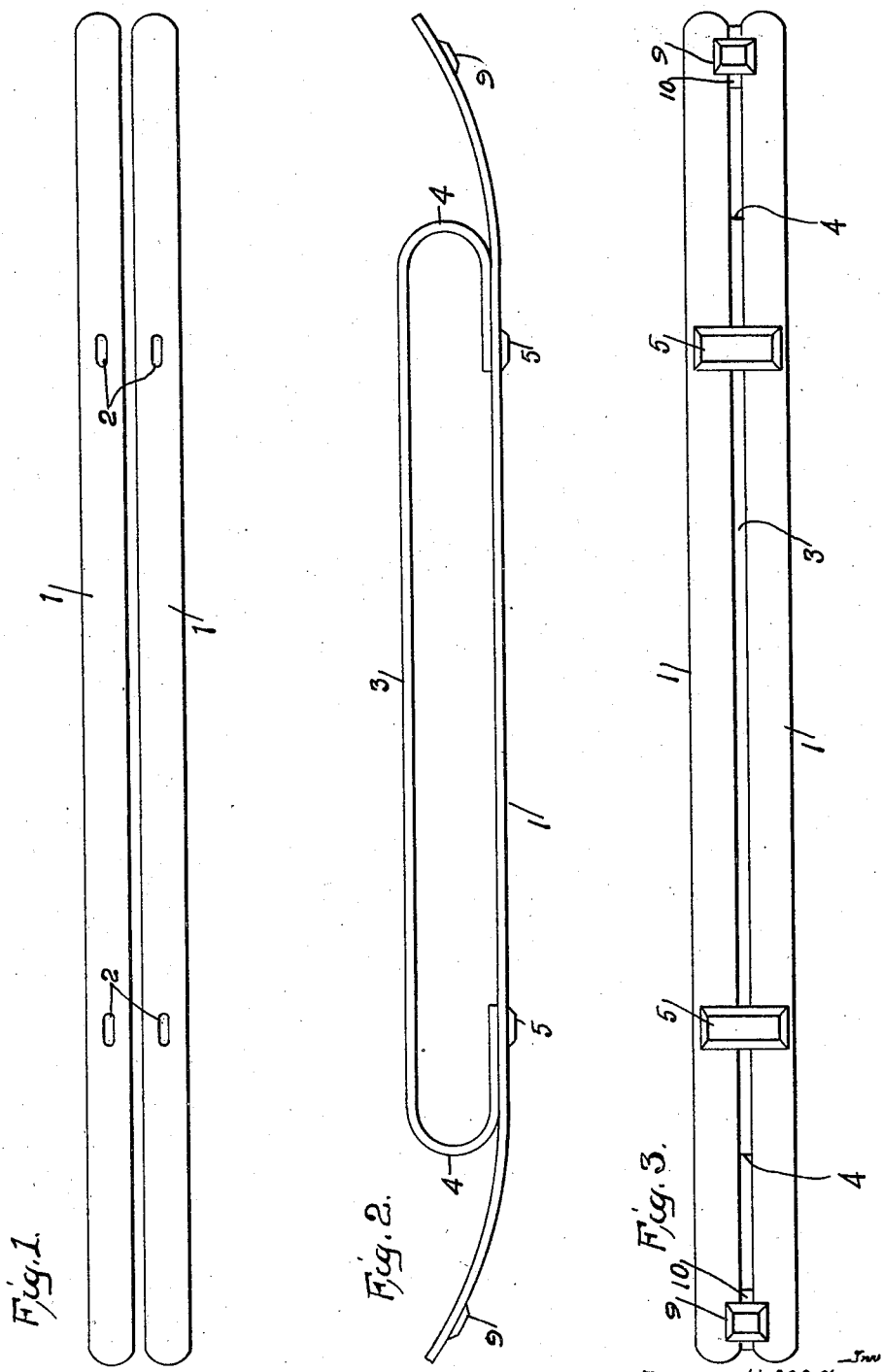
Inventor
EDWARD H. McCLOUD,
BY Toulmin & Toulmin
Attorneys.

April 8, 1930.  E. H. McCLOUD  1,753,993
BUMPER
Filed July 26, 1928   2 Sheets-Sheet 2
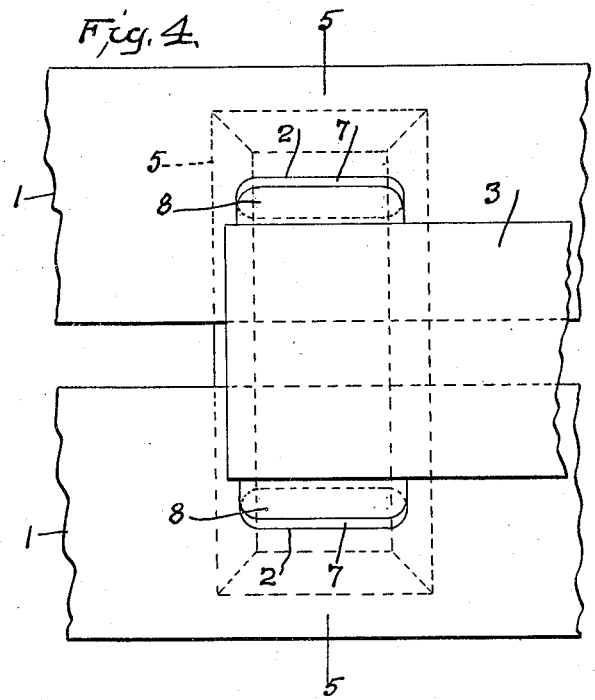
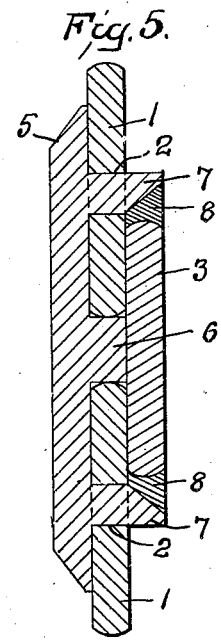
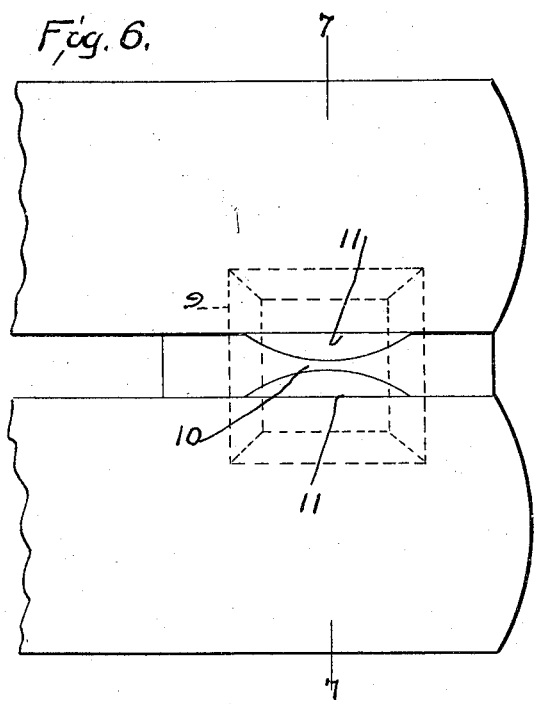
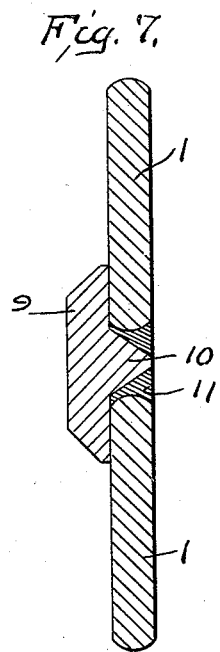
Edward H. McCloud, Inventor
By Toulmin & Toulmin, Attorneys Patented Apr. 8, 1930

1,753,993

UNITED STATES PATENT OFFICE

EDWARD H. McCLOUD, OF COLUMBUS, OHIO, ASSIGNOR TO THE CENTRAL BRASS AND FIXTURE COMPANY, OF SPRINGFIELD, OHIO, A CORPORATION OF OHIO

BUMPER

Application filed July 26, 1928. Serial No. 295,416.

This invention relates to bumpers.

It is the object of this invention to provide a bumper in which the parts are securely attached together. It is also an object of this invention to provide a bumper in which the parts are reduced to a minimum and are so constructed, with relation to each other, as to be secure, firm and effective for the purpose for which they are intended.

It is the purpose of this invention also to provide a bumper in which each of the parts is welded to another part to form a bumper in which the structure is essentially, when completed, composed of one piece of metal.

It is an object of this invention to provide a bumper of this type in which the parts are so constructed and related to each other that they are firmly welded to form a bumper substantially of one continuous piece of metal.

For the purpose of illustration the accompanying drawings present a preferred embodiment.

In the drawings:

Figure 1 shows a face view of the bumper bars detached from the other parts.

Figure 2 is a plan view of the completed bar.

Figure 3 is a face view of the bumpers in their completed condition, showing the clamp members associated therewith.

Figure 4 is an enlarged view showing the rear of the clamp bar attached to the bumper bars.

Figure 5 is a cross section on the line 5—5 of Figure 4.

Figure 6 is a back view of one end of the bumper bars, showing the end plate and its manner of attachment to the bars.

Figure 7 is a cross section on the line 7—7 of Figure 6.

This device is composed essentially of three bars, two of which are bumper bars and the other of which is a back bar. The bumper bars, indicated by the numeral 1, are arranged parallel with each other and slightly apart. In each of these bars, near the ends thereof, are holes 2. These holes are adapted to receive a stud, later on described.

Conveniently attached to the bumper bars, and for the purpose of holding the bars in their proper spaced relation to each other and for the purpose of providing a support therefor, there is a back bar 3. This back bar is bent at each end in the form of a loop, the free ends of which are attached to the bumper bars, as indicated by the numeral 4.

For the purpose of attaching the two bumper bars together, in connection with the holes 2, there is a clamp plate 5. This clamp plate has an intermediate stud 6, which fits between the two parallel bumper bars and holds them in spaced relation. Near the end of the clamp member 5 there are two stud members 7, which project through the holes 2. The stud 6 is just long enough to reach through the space between the bumper bars and be flush with the back surface thereof, while the studs 7 extend beyond the back limits of the holes 2.

The looped ends of the back bar 3 are adapted to fit over the space between the bumper bars at the point where the stud 6 engages the two bars. The inner faces of the outer ends of the studs 7 are beveled, and between these two faces the looped ends of the back bar 3 fit.

When the back bar is placed in position with its looped ends engaging the bumpers at the point where the clamps 5 are in engagement with the bars, the studs 7 project along the sides of the back bar and extend to a line flush with the back side of the back bar. When the back bar is in the position here described there is a wedge shaped opening between the studs 7 and the back bar. For the purpose of attaching the parts securely together the studs 7, the back bar 3 and the bumper bars 1 are welded together at the point 8, which also indicates the beveled surface on the studs 7.

The shape of this surface, which might be called a weld cup, is better shown and illustrated in Figure 4. The cup part does not extend entirely across the lugs 7, but is scooped out to form a kind of a trough with the ends closed.

For the purpose of securely fastening the parts together they are welded by means of some suitable welding method or process, by which the cavity formed by the weld cup is entirely closed up in the process of welding.

In welding the parts, as here shown, a piece of filling material is used as one of the electrodes and melts directly into place in the cups to be filled. By this process of welding the front parts of the bumper, which may be in its finished polished state, are not marred or affected by the process of welding.

The same method of welding is used in connection with the plate clamps at the ends of the bars. These clamps are indicated by the numeral 9, and have extending therefrom a stud 10, which has in each face thereof a weld cup 11. The stud 10 fits in between the bumper bars near the ends thereof, and is adapted to hold the bars in spaced relation to each other. This stud 10 may be longer than the plate clamp, but is not intended to extend beyond the ends of the bars.

For the purpose of securely fastening the bars together with the plate clamps secured thereto, the parts are welded in a manner similar to that described in connection with what might be called the bar clamps. Suitable welding material is applied to the space formed by the weld cup in connection with the edge of the bumper bars. This welding material is heated in connection with the adjoining surface of the bumper bars and the stud 10 so that a secure and permanent weld is effected.

The ends of the bars are curved, as indicated in Figure 2, as is usually the custom in bumper bars. The plates may be of any ornamental design and are primarily used for the purpose of clamping the parts in firm and secure relation to each other.

By this process and method applicant has formed a bumper in which the parts are securely attached together, and one that is capable of bearing a good deal of heavy strain.

I desire to comprehend within my invention such modifications as may be clearly embraced within my claims and the scope of my invention.

Having thus fully described my invention, what I claim as new and desire to secure by Letters Patent, is:

1. In a bumper, a pair of bumper bars, each bar having a series of holes arranged therein in the same relative position to each other, clamp means having studs thereon and projecting through the holes in the bars and adapted to hold the bars in fixed spaced relation to each other, the bars and the clamp means being permanently united to form a rigid bumper.

2. In a bumper, a pair of bars held in spaced relation to each other and having a series of holes in each bar, a back bar, means engaging the bumper bars and extending through the holes therein and also engaging the back bar, and integrally attached to the bumper bars and the back bar to hold them in rigid fixed relation to each other.

3. In a bumper, a pair of bumper bars held in spaced relation with each other, each bar having a series of holes arranged therein, the holes of one bar being adjacent the holes in the other, a clamp plate having a stud near the center thereof adapted to extend through the space between the bars, and a stud adjacent each end adapted to extend through the holes in the bumper bars and means for uniting the plate and the bumper bars at the point where the studs pass through said holes.

4. In a bumper, a pair of bumper bars held in spaced relation to each other having a series of adjacently arranged holes therein, a back bar attached to said bumper bars across the space therebetween and means extending through the holes in the bumper bars and contacting the back bar to hold the bumper bars and the back bar in rigid integral relation to each other.

5. In a bumper, a pair of bumper bars, each bar having a series of holes arranged therein in the same relative positions to each other, and a clamp means having studs thereon projecting through the holes in the bars to hold the bars in fixed spaced relation to each other, the bars and the clamp means being welded together to form a rigid bumper.

6. In a bumper, a pair of spaced bumper bars, and a lock bar engaging one side of said bumper bars and having means integral with the back bar to engage the other side of said bumper bars to hold said bumper bars to the lock bar and in spaced relation to each other.

In testimony whereof, I affix my signature.

EDWARD H. McCLOUD.